United States Patent [19]

Sinkauz

[11] 4,425,532
[45] Jan. 10, 1984

[54] CIRCUIT ARRANGEMENT OF A STAIRCASE LIGHTING TIME SWITCH

[76] Inventor: Silvano Sinkauz, Ruze Petrović 19, 52000 Pula, Yugoslavia

[21] Appl. No.: 348,714

[22] Filed: Feb. 16, 1982

[51] Int. Cl.³ ............................................ H05B 37/02
[52] U.S. Cl. ............................... 315/360; 307/252 B; 315/200 R; 340/309.15; 340/530
[58] Field of Search ................... 307/252 B, 592, 595, 307/597, 603, 604; 340/530, 309.15, 31 R; 315/360

[56] References Cited

U.S. PATENT DOCUMENTS 3,648,107  3/1972  Rydborn .............................. 315/360
4,160,192  7/1979  McAllise ............................. 315/360

Primary Examiner—Harold Dixon
Attorney, Agent, or Firm—Fleit, Jacobson, Cohn & Price

[57] ABSTRACT

Circuit arrangement of a staircase lighting time switch offers a possibility of an automatic reduction of the light power of lamps lighting the staircase whereby the user is warned that the time of the switch is running out. The time period of full power as well as the time period of reduced power can be set separately. Each activation of the push-button switch prolongs the operation of the circuit for the operation time to which it is adjusted.

3 Claims, 1 Drawing Figure

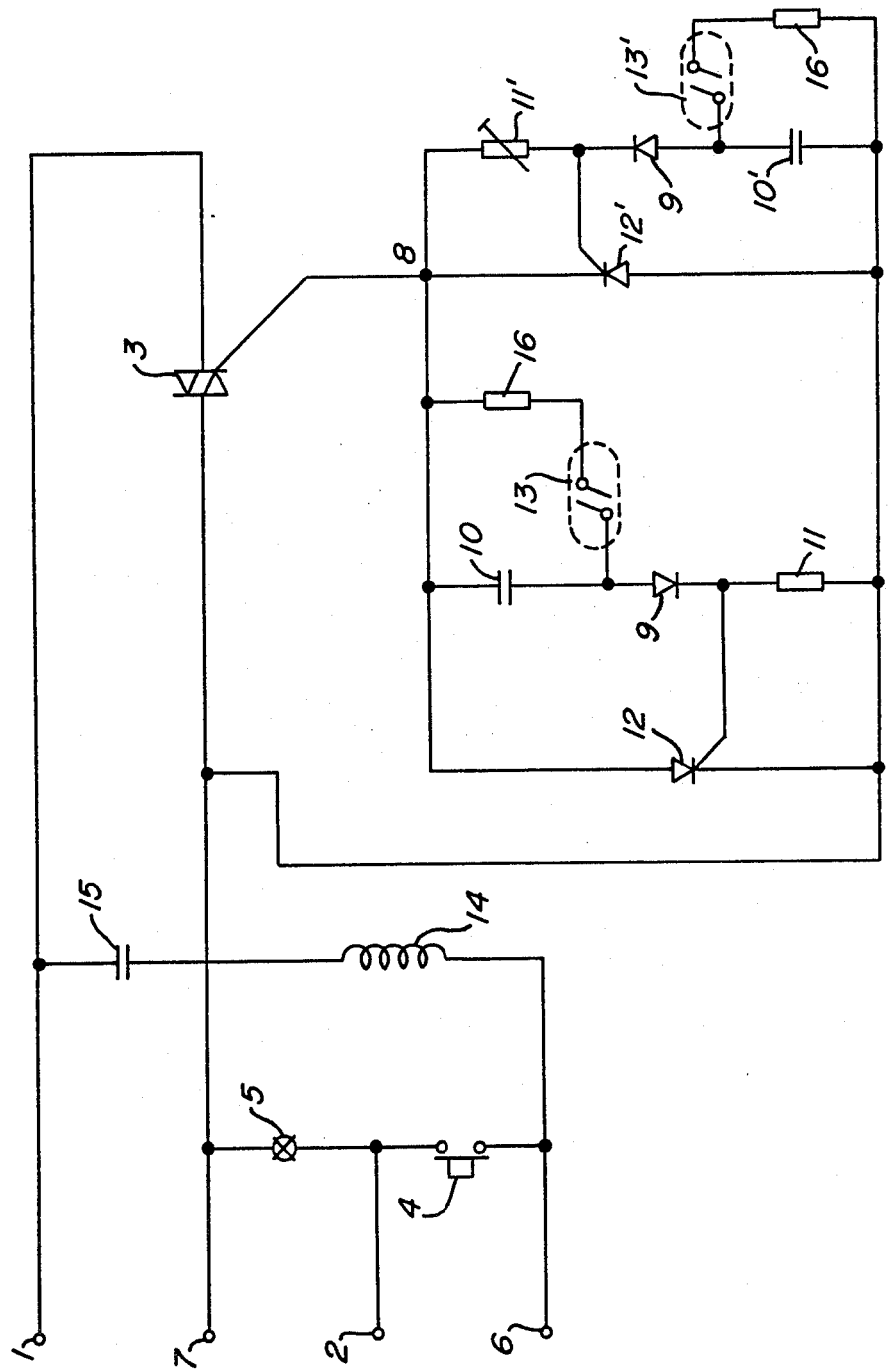

CIRCUIT ARRANGEMENT OF A STAIRCASE LIGHTING TIME SWITCH

The object of the present invention is a circuit arrangement of a staircase lighting time switch whose feature is a warning to the user that the lighting is going out The known staircase lighting time switches where the electromechanical parts have been substituted by an electrical circuit aimed at the elimination of the switching noise and the prolongation of the life-time of the switch, and also the dimensions and the price were reduced. Efforts have been made to improve reliability of the switch, however, no efforts are known to eliminate the imperfections which could be solved with known constructions but at high additional costs. Such an imperfection consists in the fact that with known staircase lighting time switches the lighting was usually switched off at the most inconvenient moment, i.e. the moment when the user was far away from the activating button.

The inventor's aim was to eliminate this imperfection and to create such a circuit arrangement for the staircase lighting time switch that would make it possible for the light intensity of the lamps, controlled thereby, to be reduced after a predetermined time whereat the user would be warned that the moment of switching off is approaching and would be able to reach the nearest activating button in time for a repeated activation of the time switch.

This aim was realized in a novel circuit diagram of the staircase lighting time switch the embodiment of which will be described in detail and shown in the enclosed drawing.

As evident from this drawing, the terminals 1, 2 are provided for the connection of the main supply whereat the terminal 1 is provided for the phase feeder and the terminal 2 for the neutral feeder of the main supply. In the power leading circuit between these two terminals 1, 2 there is provided a serial connection of a triac 3 and at least one lamp 5 which is connected between terminals 2 and 7. Between these two terminals 2, 7 several lamps 5 can be connected, the total power thereof depending on the power currect capacity of the triac 3.

The switching time determining circuit is connected between the terminal 7 and the gate 8 of the triac 3. The circuit consists in fact of two analogue circuits which are connected parallelly and in which corresponding parts have the same reference numerals, to which designation ' is added in one circuit.

In each of the two circuits there exists a series connection of a capacitor 10, 10', a diode 9, 9' and an adjustable resistor 11, 11' whereat this connection is bridged by a thyristor 12, 12'. The connection point between the cathode of the diode 9, 9' and the adjustable resistor 11, 11' is connected to the gate of the thyristor 12, 12'. Each of the capacitors 10, 10' is bridged by a series connection of a reed relay 13, 13' and a resistor 16, 16'.

Both reed relays 13, 13' are enclosed into an excitation coil 14 which is series connected with a push button switch 4 and a capacitor 15 between the terminals 1 and 2.

The operation of the circuit according to the invention is as follows: in the resting time of the switch the triac 3 does not conduct i.e. it offers a high resistance and therefore the entire main supply voltage occurs over the triac 3, i.e. between terminals 1 and 7. As the gate 8 is also nearly on the potential of terminal 1, capacitors 10, 10' are charged by diodes 9, 9'. The tension caused in them by this charge shifts the gate voltage of the thyristors 12, 12' to such a value that thyristors 12, 12' are non-conducting, thus also the gate of the triac 3 gets no ignition current and the entire circuit remains in a stable non-conducting state.

If the button switch 4 is pushed for a moment only, the AC current through the exciting coil 14 and the capacitor 15 causes the activation of both reed relays 13, 13'. At this moment resistors 16, 16' are connected parallelly to the capacitors 10, 10', which causes their discharging. Therefrom results the raising of the trigger gate current of the thyristors 12, 12', which makes them conducting so that the gate 8 of the triac 3 gets enough trigger gate current to become conducting, and so the lamps 5 start lighting. It is known that due to the "half-cycling effect" a triac does not conduct both half-waves of an AC current if the trigger gate current is not high enough. As the raising of the trigger gate current of the triac 3 does not occur in an infinitely short time, this gate current first passes a value which is high enough for the conduction of a half wave only—the consequence being that the lamps 5 go on with half power only and full power is attained some parts of a second later. Due to this effect the life time of the lamps 5 becomes longer.

As there still remains some voltage drop between the main terminals of the triac 3, both capacitors 10, 10' start charging due to the rectification effect of the diodes 9, 9'. The charging time can be adjusted by setting the value of the adjustable resistor 11, 11'. After the time has been predetermined in this manner, the voltage of the gate of one of the thyristors 12, 12' reaches such a value that it no longer gets any trigger gate current and stops conducting. This results in that the triac 3 stops conducting one half-wave and so the lamps 5 light with their half-power only—this represents a warning to the user of the time switch that the light will go out soon. After the predetermined period also the other one of the thyristors 12, 12' stops conducting and since at that moment the triac 3 is blocked completely, the lamps 5 are switched off.

At the end of this description we would wish to emphasize also the fact that the operation of the circuit according to the invention makes it possible also to prolong the operation of the time switch with each pressing of the button switch 4 since thereby there always occurs a discharging of capacitors 10, 10' so that their charging starts from the beginning, and as of that moment the entire operational cycle of the staircase lighting time switch starts all over again.

It is evident that both reed relays 13, 13' can be substituted by another component, e.g. an electromechanical relay. In this case also the activating circuit would be different, i.e. without the coil 14 and the capacitor 15.

I claim:

1. Circuit arrangement of a staircase lighting time switch comprising a triac (3), the first main terminal of which is connected to one power terminal (1) and the second main terminal of which is connected to the lamp terminal (7) to which the lamps (5) are connected, and that for controlling the trigger gate current of the triac (3) two triggering circuits are used, each consisting of a thyristor (12, 12') in parallel to the anode and the cathode of which a serial connection of a capacitor (10, 10'), a diode (9, 9') and a resistor (11, 11') is connected so that one connection of the capacitor (10, 10') is connected to the anode of the thyristor (12, 12') and the other connection of the resistor (11, 11') to the cathode of the thyristor (12, 12'), whereat in parallel to the capacitor (10, 10') for discharging it a series connection of a reed relay (13, 13') and a resistor (16, 16') is connected, and that for securing the trigger gate current for the triac (3) for both half-waves the thyristors (12, 12') are connected between the second main terminal (7) of the triac (3) and its gate (8) in such a manner that to this gate (8) the anode of the thyristor (12) and the cathode of the thyristor (12') are connected.

2. Circuit arrangement according to claim 1, characterized in that for activating the reed relays (13, 13') these relays (13, 13') are enclosed into a coil (14) connected through a capacitor (15) to the power terminal (1) and through the terminal (6) to one contact of the push-button switch (4), the other contact of which is connected to the other power terminal (2).

3. Circuit arrangement according to claim 1, characterized in that the resistors (11, 11') are adjustable.

* * * * *